US006537633B1

(12) United States Patent
Fogle

(10) Patent No.: US 6,537,633 B1
(45) Date of Patent: Mar. 25, 2003

(54) COMPOSITE LABEL WEB AND METHOD OF USING SAME

(75) Inventor: Ronald L. Fogle, Springboro, OH (US)

(73) Assignee: Paxar Corporation, White Plains, NY (US)

( * ) Notice: Subject to any disclaimer, the term of this patent is extended or adjusted under 35 U.S.C. 154(b) by 253 days.

(21) Appl. No.: 09/645,846

(22) Filed: Aug. 24, 2000

(51) Int. Cl.[7] ................................................ B32B 7/06

(52) U.S. Cl. ..................... 428/40.1; 428/42.3; 428/136; 428/137; 428/906; 226/1

(58) Field of Search ................................ 428/42.3, 136, 428/137, 906, 40.1; 156/249, 344; 226/1

(56) References Cited

U.S. PATENT DOCUMENTS

| | | | |
|---|---|---|---|
| 4,280,862 | A | 7/1981 | Hamisch, Jr. |
| 4,309,468 | A | 1/1982 | St. Aubin |
| 4,393,107 | A | 7/1983 | Jenkins |
| 4,521,267 | A | 6/1985 | Jacobson |
| 4,556,442 | A | 12/1985 | Torbeck |
| 5,705,245 | A | 1/1998 | Loemker et al. |
| 5,988,249 | A | 11/1999 | Mistyurik et al. |

*Primary Examiner*—Alexander S. Thomas
(74) *Attorney, Agent, or Firm*—Joseph J. Grass

(57) ABSTRACT

There is disclosed a composite label web that can be used in different labelers having different feed wheels. The different feed wheels have different arrangements or patterns of feed teeth. The composite label web is comprised of a carrier web and labels releasably adhered by pressure sensitive adhesive to the carrier web. There is a separate feed aperture pattern in the carrier web for each pattern of feed teeth. The number of feed apertures is kept to a minimum, and more particularly the number of feed apertures is less than the total number of feed teeth.

8 Claims, 4 Drawing Sheets

COMPOSITE LABEL WEB AND METHOD OF USING SAME

BACKGROUND OF THE INVENTION

1. Field of the Invention

This invention relates to the field of composite label webs and to method of using composite label webs.

2. Brief Description of the Prior Art

The following U.S. patents are made of record: U.S. Pat. Nos. 4,280,862; 4,309,468; 4,393,107; 4,521,267; 4,556,442; 5,705,245; and 5,988,249. In addition, it is known in the art to provide composite label webs that are usable in labelers having different feed wheels, wherein one pattern of feed apertures in the carrier web of the composite label web is solely for the pattern of feed teeth of one feed wheel, and the other pattern of feed apertures in the carrier web is solely for the pattern of feed teeth of the other feed wheel. This results in a large number of feed apertures in the carrier web, which may subject the carrier web to increased likelihood of tearing when used in a labeler. All of the teeth on the one feed wheel of the one labeler enter and engage only all of the one feed apertures in the label-carrying web; or all of the teeth on the other feed wheel of the other labeler enter and engage only all of the other feed apertures in the label-carrying web.

In general, feed wheels differ in width and diameter depending upon the width and length of the labels which the labeler is intended to dispense. The number of teeth on a feed wheel of a labeler is dependent on the amount of drag or force required to advance the carrier web through a serpentine path through the labeler. There is normally a safety factor so that the number of teeth are more than adequate for advancing the carrier web without unduly stressing the carrier web at the feed apertures. This safety factor means that the feed wheels are sometimes designed with more feed teeth than are absolutely necessary to advance the carrier web through the labeler.

SUMMARY OF THE INVENTION

The invention relates to an improved composite label web and to method of using a composite label web. The invention takes advantage of the fact that the entire safety factor or overdesign may not be absolutely necessary in a properly functioning labeler.

According to the invention, an improved composite label web is provided that can be used in different labelers having different feed wheels with different feed tooth patterns, without unduly weakening the carrier web of the composite label web or otherwise increasing the tendency of the carrier web to tear.

According to the invention, the number of feed apertures in the carrier web can be reduced by using less than all the feed teeth of the two different feed wheels. For example, one feed wheel can have four laterally spaced circumferentially extending rows of feed teeth, only three of which are used to advance the carrier web. Thus, only three columns of feed apertures are required in the carrier web for the three rows of feed teeth. The unused feed teeth of the remaining row can enter or be received in another column or line of feed apertures in the carrier web but do not drivingly engage the carrier web; the other feed wheel can have three laterally spaced, circumferentially extending rows of feed teeth, only two of which are used to advance the carrier web. Thus, only two columns of feed apertures are required in the carrier web for these two rows of feed teeth. The unused feed teeth of the remaining row can enter or be received in another column or line of feed apertures in the carrier web but do not drivingly engage the carrier web. In this way, the unused teeth of each feed wheel merely enter but do not engage feed apertures which would normally be used by the other feed wheel to advance the carrier web.

It is a feature of the invention to provide an improved composite label web having labels releasably adhered to a carrier web, wherein the carrier web can be advanced either by a labeler having M number of teeth engageable with less than M number of feed apertures of a first pattern in the carrier web, or by a labeler having N number of teeth engageable with less than N number of feed apertures of a second pattern in the carrier web.

It is a feature of the invention to provide an improved composite label web which can be advanced by either one of two feed wheels having different feed tooth patterns, wherein the number of feed apertures in the carrier web is less than the number of engaging teeth of the two feed wheels.

It is another feature of the invention to provide an improved method of advancing a composite label web, wherein the carrier web is advanced by either one of two feed wheels, but some of the teeth of each feed wheel do not engage the carrier web to keep the number of feed apertures in the carrier web to a minimum.

In one specific embodiment, a composite label web can be used in labelers having different first and second feed wheels. The first feed wheel has a plurality of like first feed tooth patterns. The second feed wheel has a plurality of like second feed tooth patterns which differ from the first feed tooth patterns. The composite label web includes a longitudinally extending carrier web and labels releasably adhered thereto. The carrier web has first repetitive patterns of first feed apertures and second repetitive patterns of second feed apertures. The first apertures are engageable with some but not all of the first feed teeth and the second apertures are engageable with some but not all of the second feed teeth. The sum of the feed apertures in the first pattern and the second pattern is less than the sum of the feed teeth in the first feed tooth pattern and the second feed tooth pattern.

BRIEF DESCRIPTION OF THE DIAGRAMMATIC DRAWINGS

DETAILED DESCRIPTION OF A PREFERRED EMBODIMENT

Figure 1:
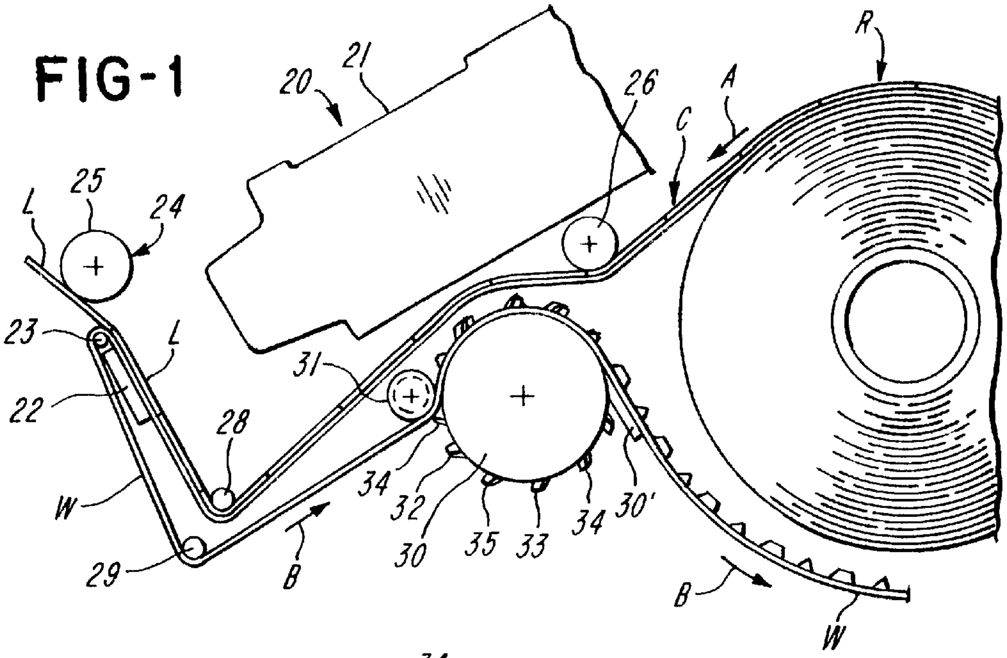
FIG. 1 is a diagrammatic view of one arrangement for using the composite label web of the invention.
Figure 2:
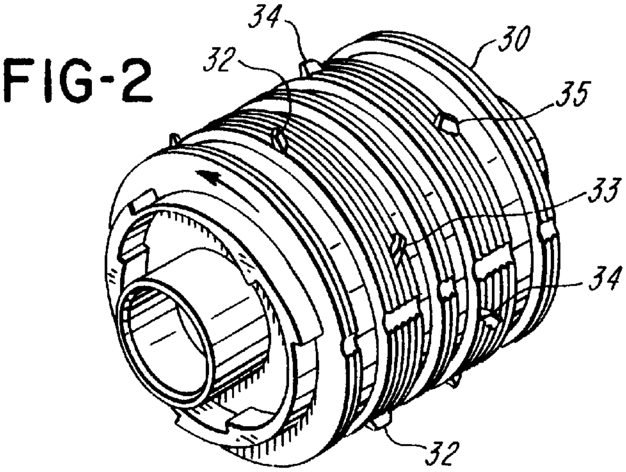
FIG. 2 is a perspective view of a toothed feed wheel shown diagrammatically in end elevation in FIG. 1, wherein the feed wheel rotates counterclockwise as seen in FIG. 2.
Figure 3:
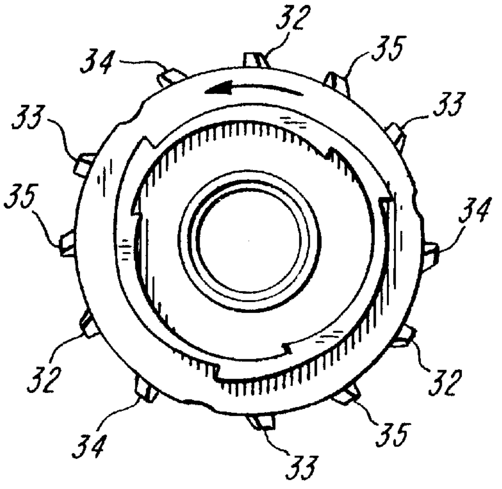
FIG. 3 is a left end elevational view of the feed wheel as seen in FIG. 2, wherein the feed wheel rotates counterclockwise.
Figure 4:
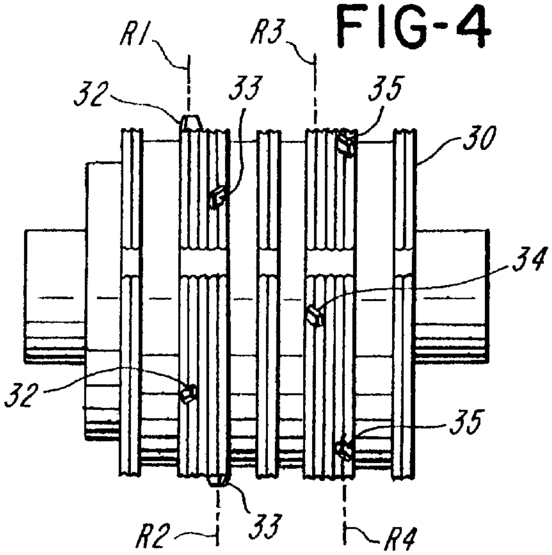
FIG. 4 is a side elevational view of the feed wheel as seen by looking at the right side of FIG. 3.
Figure 8:
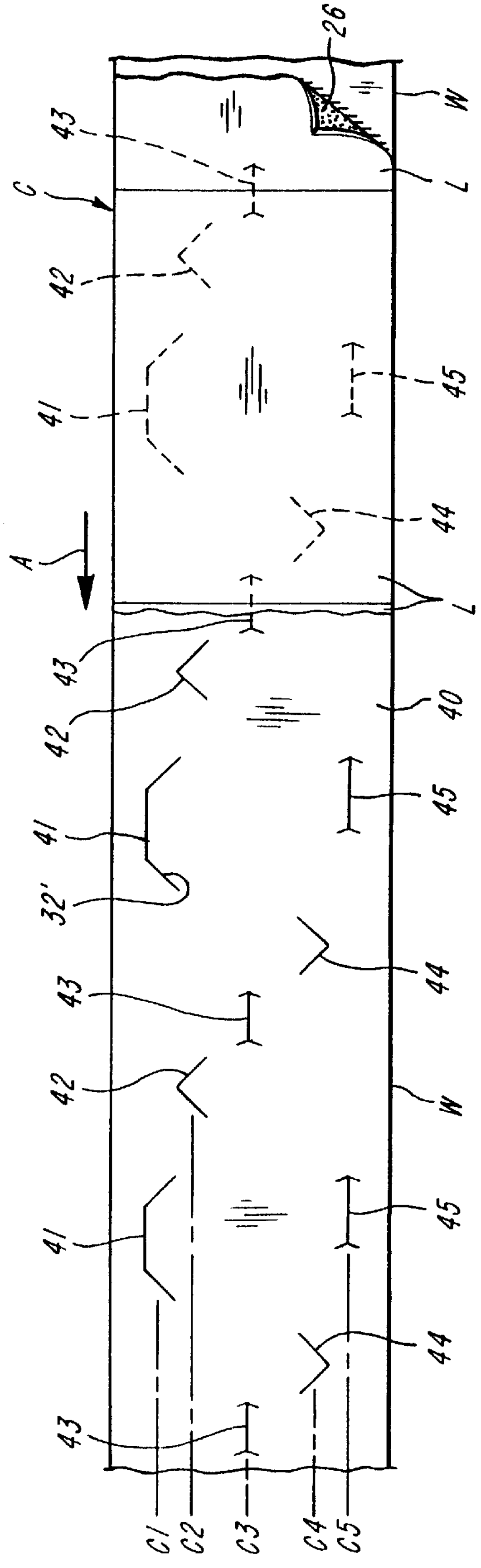
FIG. 8 is a fragmentary top plan view of a composite label web in accordance with the invention.

With reference to FIG. 1, there is shown a diagrammatic representation of a labeler generally indicated at 20 and a composite label web C. For further details of such a labeler 20, reference may be had to a labeler of the type disclosed in U.S. Pat. No. 5,988,249, the disclosure of which is incorporated herein by reference. The labeler 20 is shown to include a print head 21, a platen 22 with which the print head 21 cooperates, a delaminator in the form of a peel roller 23, and an applicator 24 in the form of an applicator roll 25. A composite label web roll R is comprised of the wound up composite label web C having a carrier web W to which labels L are releasably adhered by pressure sensitive adhesive 26 (FIG. 8). The composite label web C passes in the direction of arrow A from the roll R to beneath a brake roll 26, beneath a roll 28, over the platen 22 and to the peel roller 23 where labels L are successively delaminated as the carrier web W is advanced through a sharp angle bend as shown. From there the web W passes partly about a roll 29 and passes in the direction of arrow B between a toothed feed wheel 30 and a grooved die roller 31. The feed wheel 30 has four rows of teeth 32 through 35 which are staggered in the circumferential direction as best shown in FIGS. 2 and 4. The feed wheel 30 is designed to feed a carrier web having four columns of feed apertures. The teeth 32 are disposed in row R1, the teeth 33 are disposed in row R2, the teeth 34 are disposed in row R3, and the teeth 35 are disposed in row R4. There are three sets of like patterns of feed teeth, namely, the sequence or pattern of teeth 34, 32, 35 and 33. Thus, there are three, one-two-three-four patterns of teeth 34, 32, 35 and 33 around the feed wheel 30. As shown, each of the teeth 34, 32, 35 and 33 of each row is axially offset around the periphery of the feed wheel 30, and the rows R1 through R4 are axially offset or spaced from each other.

As the feed wheel 30 and die wheel 31 rotate and with the teeth 32 through 34 in engagement with the web W (FIG. 9), the composite label web C is advanced to bring a label L to a printing position between the print head 21 and the platen 22. When the print head 21 cooperates with the platen 22, the label L is printed, and thereafter the feed wheel 30 is again rotated to bring the just printed label L to the label applying position in underlying relationship to the applicator roll 25. A stripper 30' strips the carrier web W from the feed wheel 30 as the carrier web W is advanced by the feed wheel 30.

Figure 5:
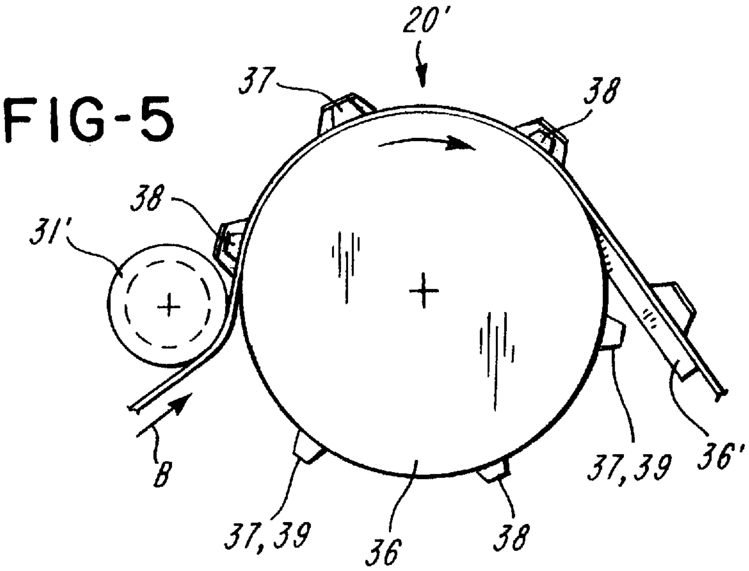
FIG. 5 is a fragmentary view showing another arrangement for using the composite label web of the invention.
Figure 6:
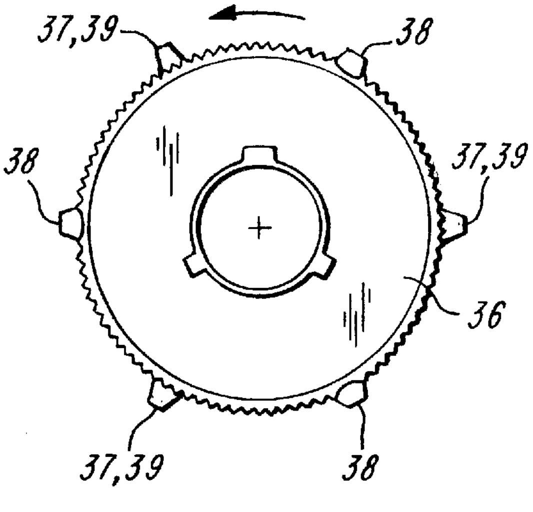
FIG. 6 is a more detailed end elevational view of the toothed feed wheel shown diagrammatically in FIG. 5.
Figure 7:
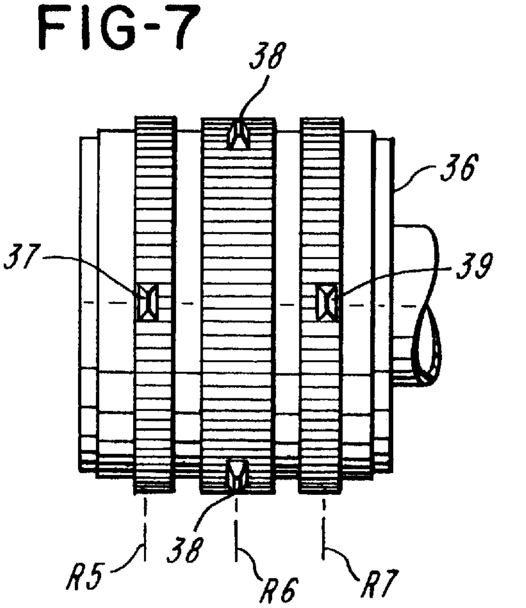
FIG. 7 is a side elevational view of the toothed feed wheel as seen by looking at the right side of FIG. 6.

The labeler 20' of the embodiment of FIGS. 5 through 7 operates in the same way in many respects, and includes a grooved die roller 31', a cooperating feed wheel 36 and a stripper 36'. For further details of such a labeler 20', reference may be had to the type of labeler disclosed in U.S. Pat. No. 4,280,862, the disclosure of which is incorporated herein by reference. The feed wheel 36 is designed to feed a carrier web having three columns of feed apertures.

The arrangement of FIGS. 5 through 7 differs from the arrangement shown in FIGS. 1 through 4. The arrangement shown in FIGS. 5 through 7 is identical to the arrangement of FIGS. 1 through 4 except that the feed wheel 36 differs from the feed wheel 30. As best shown in FIG. 7, the feed wheel 36 has three rows R5, R6 and R7 of teeth 37, 38 and 39 arranged in three sets of like two-one patterns around the periphery or circumference of the feed wheel 36. Each two-one pattern has two teeth 37 and 39 and one tooth 38. The teeth 37, 38 and 39 of respective rows R5, R6 and R7 are axially offset or spaced, and the teeth 38 are staggered with respect to the pairs of teeth 37 and 39.

With reference to the composite label web C shown in detail in FIG. 8, there is shown the carrier web or liner W which has a release coating such as silicone on its upper surface 40. A series of labels L is releasably adhered by the pressure sensitive adhesive 26 to the carrier web W. The adhesive 26 on the underside of labels L releasably adheres the labels L to the silicone on the surface 40. The carrier web W has a composite pattern of feed apertures made by forming cuts or slits in the carrier web W. There are five different cut configurations of feed apertures formed in a repeating arrangement in the carrier web W. Each cut configuration is disposed in a different column C1 through C5 in the carrier web W. The configuration of three cuts define feed apertures 41 disposed in column C1, angle-shaped cuts which extend in one lateral direction define feed apertures 42 in column C2, generally I-shaped cuts define feed apertures 43 in column C3, angle-shaped cuts which extend in the opposite lateral direction in column C4 define feed apertures 44, and generally I-shaped elongate cuts define feed apertures 45 in column C5. The feed apertures 41 are longer than feed apertures 44, and feed apertures 45 are longer than feed apertures 43. The cuts 41 through 45 which underlie the labels L are shown by broken lines. The feed apertures 41 through 45 preferably extend completely through the web W but preferably do not penetrate the labels L.

The composite pattern of feed apertures includes a pattern of feed apertures 44, 41 and 42 engaged by the feed teeth 34, 32 and 33, respectively, and a pattern of feed apertures 43 and 45 engaged by the feed teeth 38 and 39, respectively.

Neither the teeth 35 nor the teeth 37 are used to advance the carrier web W, so less than all the feed teeth of the feed wheel 30 are used and less than all of the feed teeth of the feed wheel 36 are used.

Figure 9:
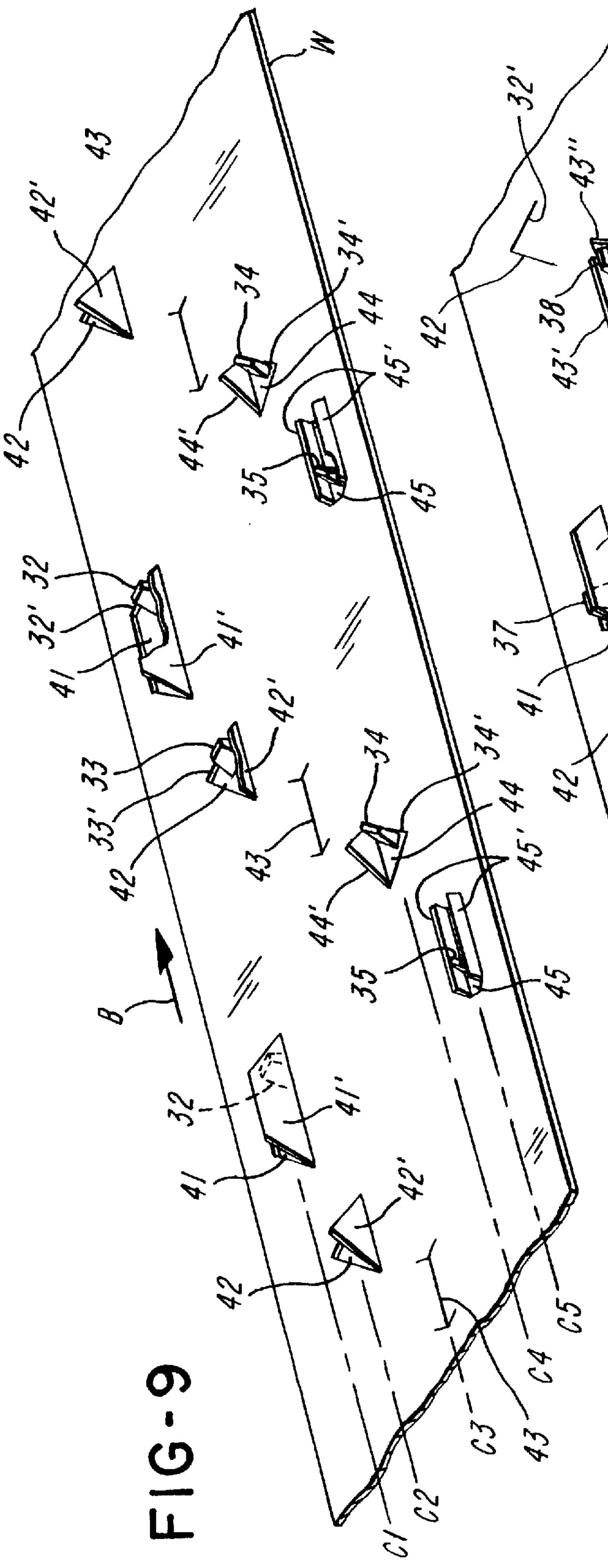
FIG. 9 is a fragmentary, perspective, developed view of the carrier web showing the feed wheel of FIGS. 1 through 4 advancing the carrier web.

As best shown in FIG. 9, the carrier web W is being advanced in the feed direction shown by arrow B. When the web W is used with the feed wheel 30 in the labeler 20 of FIGS. 1 through 4, the feed teeth 32 enter the feed apertures 41 and fold flaps 41' out of the plane of the web W as shown, and engage feed faces or surfaces 32'. As the teeth 33 enter the web W at the feed apertures 42, the teeth 33 fold a flap 42' out of the plane of the web W. Engagement of one or more teeth 33 with the feed faces 33' helps to advance the web W. The teeth 34 engage the feed apertures 44 at feed faces 34'. The teeth 34 fold flaps 44' out of the plane of the web W. The feed apertures 45 enable the teeth 35 to enter the web W, however, the teeth 35 do not engage any feed face. As seen in FIG. 9, when the teeth 32 through 34 engage the web W, the teeth 35 are spaced from both ends of the feed apertures 45. Therefore, the teeth 35 can enter the web W at the feed apertures 45 but do not engage any feed face. The feed teeth 35 merely passively enter into the feed apertures 45. It is apparent that only the feed apertures 41, 42 and 44 in columns C1, C2, and C4 are used by the feed wheel 30 to advance the web W.

Figure 10:
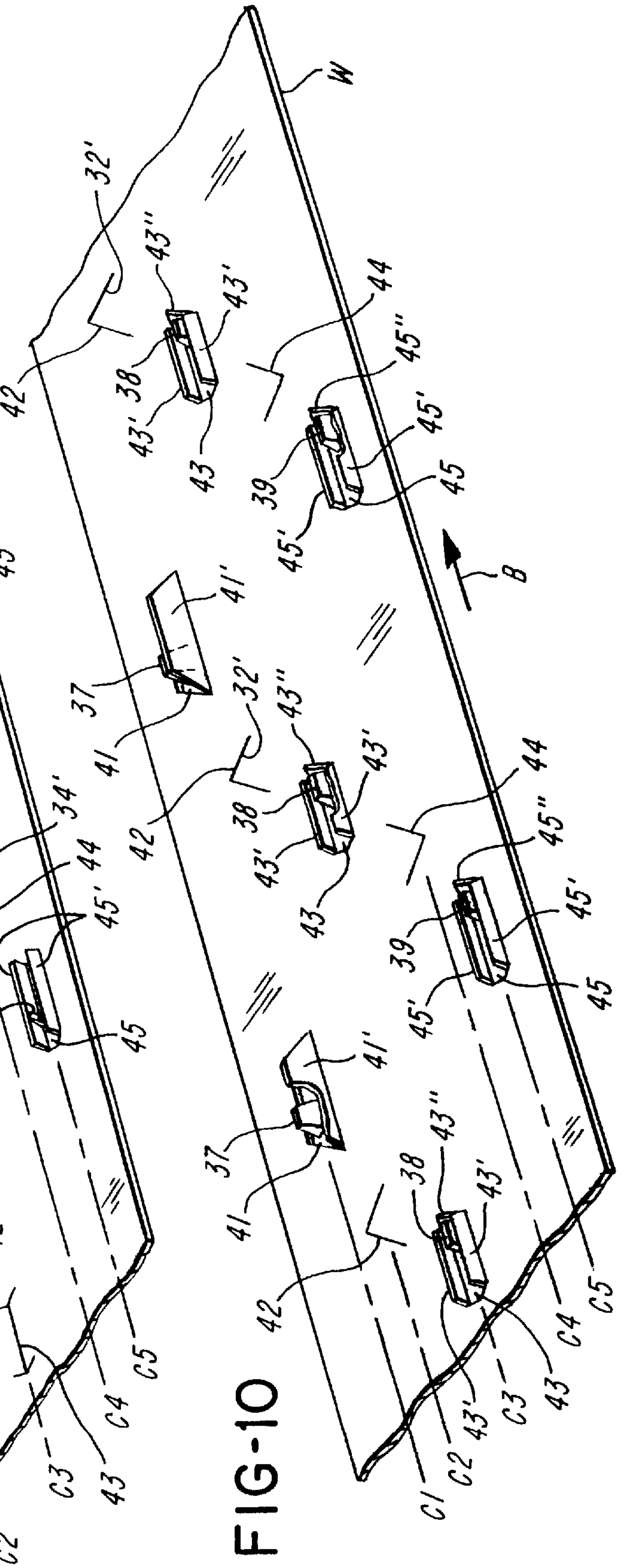
FIG. 10 is a developed view similar to FIG. 9, but showing the feed wheel of FIGS. 5 through 7 advancing the carrier web.

With respect to FIG. 10, the web W is advanced by the feed wheel 36 in the feed direction shown by the arrow B. Rows R5, R6 and R7 are aligned with columns C1, C3 and C5. There is no tooth of the feed wheel 36 aligned with columns C2 and C4. The teeth 38 and 39 which are aligned with columns C3 and C5 open feed apertures 46 and 45 and lift the respective flaps 43' and 45' and engage folded edges of flaps 43" and 45" for advancing the web W. The teeth 37 lift the flaps 41' but do not engage any feed face. The feed apertures 41 form convenient places for the teeth 37 to enter the web W.

It is noted that less than all the teeth of each feed wheel 30 and 36 are used to feed the web W. However, those teeth 32, 33 and 34 of the feed wheel 30 and those teeth 38 and 39 of the feed wheel 36 can advance the composite label web C through the respective labeler 20 or 20'. The teeth 35 and 37 of the respective feed wheels 30 and 36 which are not used do not impede or in any way affect the operation or functioning of labeler 20 or 20'.

It is readily apparent that the same composite label web C can be used in either the labeler 20 or the labeler 20'. Yet the web W is wide enough and the cut configurations 41 through 45 are spaced far enough apart so that the integrity or strength of the web is not unduly compromised. Thus, the carrier web W is not as apt to tear as would be the case if there were a feed aperture for every feed tooth or if there were so many apertures in the carrier web W that the feed apertures had to be too close to each other.

The feed apertures 41 through 45 are in a repeating composite pattern along the web W. As the web W is advanced either by the feed wheel 30 or by the feed wheel 36, multiple teeth engage the web W. When using the feed wheel 30, one or more teeth 32 in column C1, one or more teeth 33 in column C2 and one or more teeth 34 in column C4 engage the carrier web W while teeth 35 enter the feed apertures 45 without engagement of with any feed face on the web W, and specifically, when using the feed wheel 36, one or more teeth 38 in column C3 and one or more teeth 39 in the column CS engage the web W while teeth 37 enter the feed apertures 37 without engagement of any feed face in the web W.

As seen, if M number of feed teeth 32 through 35 are on the feed wheel 30, then less than M number of feed teeth engage the web W to advance it. Similarly, if M number of feed teeth 37 through 39 are on the feed wheel 36, then less than the M number of feed teeth engage the web W to advance it. Also, the number of feed apertures 32 through 36 in the web W which could be engaged at any one time is less than the sum of M plus N.

The feed wheel 30, the feed teeth 34, 32, 35 and 33, and feed apertures 44, 41 and 42 can be characterized as "first", and the feed wheel 36, feed teeth 38 and 39 and feed apertures 43 and 45 can be characterized as "second" solely for clarity of identification, without in any way intending to limit the invention.

Depending on the diameter of the feed wheel 30 and the number of teeth, more than one first pattern of engaging teeth 34, 32 and 33 can be engaged with the carrier web W at any one time as shown in FIG. 1; and depending on the diameter of the feed wheel 36 and the number of teeth, more than one second pattern of engaging teeth 39 and 38 can be engaged with the carrier web W at any one time as shown in FIG. 5.

Other embodiments and modifications of the invention will suggest themselves to those skilled in the art, and all such of these as come within the spirit of this invention are included within its scope as best defined by the appended claims.

What is claimed is:

1. A composite label web for use with either first and second feed wheels with first and second feed teeth arranged in different first and second feed tooth patterns, the composite label web comprising: a longitudinally extending carrier web, labels releasably adhered by pressure sensitive adhesive to the carrier web, a first repetitive pattern of first feed apertures in and along the carrier web, a second repetitive pattern of second feed apertures in and along the carrier web, wherein the first feed apertures and at least one of the second feed apertures are positioned to receive the first feed teeth, wherein the second feed apertures and at least one of the first feed apertures are positioned to receive the second feed teeth, wherein the carrier web can be advanced solely by the first teeth engaging in first feed apertures, wherein the carrier web can be advanced solely by the second teeth engaging in second feed apertures, and wherein the first feed apertures include a cut configuration having two cuts and a cut configuration having three cuts.

2. A use for a composite label web with either first and second feed wheels with first and second feed teeth arranged in different first and second feed tooth patterns, comprising: providing a longitudinally extending carrier web and labels releasably adhered by pressure sensitive adhesive to the carrier web, a first repetitive pattern of first feed apertures in and along the carrier web, a second repetitive pattern of second feed apertures in and along the carrier web, wherein the first feed apertures and at least one of the second feed apertures are positioned to receive the first teeth, wherein the second feed apertures and at least one of the first feed apertures are positioned to receive the second teeth, and advancing the composite label web either by less than all the first teeth engaged with the carrier web or by less than all of the second teeth engaged with the carrier web.

3. A use for a composite label web as defined in claim 2, wherein the first feed apertures include two different cut configurations.

4. A use for a composite label web as defined in claim 2, wherein the first feed apertures include a cut configuration having two cuts and a cut configuration having three cuts.

5. A use for a composite label web with either first and second feed wheels with first and second feed teeth arranged in different first and second feed tooth patterns, comprising: providing a longitudinally extending carrier web and labels releasably adhered by pressure sensitive adhesive to the carrier web, a first repetitive pattern of first feed apertures in and along the carrier web, a second repetitive pattern of second feed apertures in and along the carrier web, wherein the first feed apertures are arranged to receive some of the first teeth and some of the second teeth, wherein the second feed apertures are arranged to receive some of the second teeth and some of the first teeth, the first feed apertures being arranged to be drivingly engaged by only the first feed teeth, and the second feed apertures being arranged to be drivingly engaged by only the second feed teeth, and advancing the composite label web by either the first feed wheel or by the second feed wheel.

6. A use for a composite label web with either first and second feed wheels with first and second feed teeth arranged in different first and second feed tooth patterns, comprising: providing a longitudinally extending carrier web and labels releasably adhered by pressure sensitive adhesive to the carrier web, a composite pattern of feed apertures in the carrier web including a first pattern of first feed apertures arranged to be driven by the first teeth and a second pattern of a second feed aperture in the carrier web arranged to be driven by the second teeth, the first and second feed aperture patterns being arranged so at least one of the first feed apertures is engaged by one of the first teeth and at least one of the second feed apertures receives but is not engaged by one of the first teeth, or so that least one of the second feed apertures is engaged by one of the second teeth while at least one of the first feed apertures receives but is not engaged by one of the second teeth, and advancing the composite label web by either the first feed wheel or the second feed wheel.

7. A use for a composite label web with either a first feed wheel with first feed teeth arranged in a first pattern or a second feed wheel with second feed teeth arranged in a different, second pattern, comprising: providing a longitudinally extending carrier web and labels releasably adhered by pressure sensitive adhesive to the carrier web, the carrier web having a composite pattern of feed apertures including a first pattern of first feed apertures for engaging with the first teeth and a second pattern of second feed apertures for engaging with the second feed teeth, wherein the number of first feed apertures engageable by the first teeth is less than the corresponding number of first teeth, wherein the number of second feed apertures engageable by the second teeth is less than the corresponding number of second teeth, wherein some of the first feed apertures are arranged to receive second teeth without engagement, wherein some of the second feed apertures are arranged to receive first teeth without engagement, and advancing the composite label web by either the first feed wheel or the second feed wheel.

8. Method of advancing a composite label web, comprising: providing a carrier web with labels releasably adhered thereto by pressure sensitive adhesive, first feed apertures in the carrier web arranged in a first pattern and second feed apertures in the carrier web arranged in a second pattern different from the first pattern, and advancing the web with either a first feed wheel having first feed teeth arranged in a first feed tooth pattern and engageable with first feed apertures and wherein some of the first teeth enter but do not engage the second feed apertures, or a second feed wheel having second feed teeth arranged in a second feed tooth pattern and engageable with second feed apertures and wherein some of the second teeth enter but do not engage the first feed apertures.

* * * * *